(12) United States Patent
Wittmann

(10) Patent No.: US 7,991,000 B2
(45) Date of Patent: Aug. 2, 2011

(54) INBAND CONTROLLING OF A PACKET-BASED COMMUNICATIONS NETWORK

(75) Inventor: Helmut Wittmann, Erlangen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1411 days.

(21) Appl. No.: 10/495,536

(22) PCT Filed: Nov. 7, 2001

(86) PCT No.: PCT/EP01/12871
§ 371 (c)(1), (2), (4) Date: May 7, 2004

(87) PCT Pub. No.: WO03/041344
PCT Pub. Date: May 15, 2003

(65) Prior Publication Data
US 2005/0007989 A1  Jan. 13, 2005

(51) Int. Cl.
*H04J 3/16* (2006.01)
*H04J 3/22* (2006.01)
*H04L 12/28* (2006.01)
*H04L 12/56* (2006.01)

(52) U.S. Cl. .................. 370/465; 370/412; 370/394

(58) Field of Classification Search .................. None
See application file for complete search history.

(56) References Cited

U.S. PATENT DOCUMENTS

| | | | | |
|---|---|---|---|---|
| 6,788,686 | B1 * | 9/2004 | Khotimsky et al. | 370/394 |
| 6,963,586 | B2 * | 11/2005 | Henriksson et al. | 370/469 |
| 7,116,653 | B1 * | 10/2006 | Bemmer et al. | 370/335 |
| 2001/0043577 | A1 * | 11/2001 | Barany et al. | 370/328 |
| 2001/0053971 | A1 * | 12/2001 | Demetrescu et al. | 704/201 |
| 2002/0031125 | A1 * | 3/2002 | Sato | 370/394 |
| 2002/0163908 | A1 * | 11/2002 | Lakaniemi et al. | 370/350 |
| 2003/0043784 | A1 * | 3/2003 | Selin | 370/352 |

* cited by examiner

*Primary Examiner* — Andrew Chriss

(57) ABSTRACT

Inband Controlling of a packet-based Communications NetworkA method of handling control information (CMR latest, CMR latest new) sent inband in a packet-based communications network with traffic data, wherein the network has a buffer for temporarily storing received packets, is described. The method comprises receiving one or more packets and determining (312) first control information (CMR latest new) comprised therein, deciding (314) if the first control information (CMR latest new) is newer than second control information (CMR latest) received earlier, and, if the first control information (CMR=most recent CMR latest new) is newer than the second control information (CMR latest), handling (318) the first control information (CMR latest new) independently from a buffering of the one or more received packets which comprise the first control information (CMR latest new). The invention further relates to a network component like a packet terminal or a converting gateway for performing the method and to communications systems comprising such a network component.

20 Claims, 3 Drawing Sheets

INBAND CONTROLLING OF A PACKET-BASED COMMUNICATIONS NETWORK

BACKGROUND OF THE INVENTION

1. Technical Field

The invention relates to a method of handling control information in a packet-based communications network, to a network component of such a communications network, and to communications systems comprising this network component. In particular, the invention relates to handling of control information sent inband with traffic data in a packet-based communications network.

2. Description of the Prior Art

In traditional synchronous communications networks control information is often sent inband, i.e., on the same logical channel as traffic data (traffic channel), to allow the control information to take effect at a receiving side as fast as possible. Carrying control information inband together with traffic data ensures that the control information arrives at the receiving side at exactly the same time as the traffic data which have been generated at the same point in time as the control information. The same applies if earlier generated control information still represents the latest status and is therefore being sent together with the traffic data to be transmitted next.

The main idea behind the concept of sending urgent control information inband with traffic data is the fact that the traffic channel (and often only the traffic channel) provides real-time transmission capability due to the real-time requirements of the underlying application like interactive video or interactive voice. Generally, inband control information can be sent on a specific traffic channel either on a regular basis or by stealing bandwidth on demand in the case of very urgent control information.

The control information sent inband with traffic data can relate to various control-purposes. For example, the inband control information can serve in a communications network for a remote control of an encoding rate to be used at an opposite receiving side. Such an encoding rate control allows a rapid adaption for example to a varying radio quality or to varying bandwidth constraints.

The remote control of the encoding rate is already incorporated in new speech coding concepts such as Adaptive Multi-Rate transmission (AMR, GSM 06.71 version 7.0.2, Release 1998, Digital cellular telecommunications system (Phase 2+); Adaptive Multi-Rate (AMR); Speech processing functions; General description) or in Enhanced Variable Rate Codec transmission (EVRC, TIA/EIA/IS-127, Sep. 9, 1996, Enhanced Variable Rate Codec, Speech Service Option 3 for Wideband Spread Spectrum Digital Systems). The term "codec" designates a combination of an encoder and a decoder connected in series.

The speech coding concept of AMR, which was originally developed for synchronous communications networks, incorporates a remote control of a codec mode. Multirate adaption of encoding and decoding rates in accordance with AMR is based on quality measurements of the radio channel. The measurements are processed to give an uplink (UL) quality indicator and a downlink (DL) quality indicator. The UL quality indicator is mapped onto a UL codec mode command and the DL quality indicator is mapped onto a DL codec mode request (CMR). UL codec mode and DL CMR are sent as inband signals in the UL radio channel. DL codec mode and UL codec mode command are sent as inband signals in the DL radio channel.

The speech coding concept of EVRC also incorporates a remote control of encoding and decoding rates. Instead of using a CMR which is to be fulfilled, EVRC utilizes a control command which can be regarded as a "Reduce Rate Request" (RRR). The RRR is being sent until an opposite side (which is not necessarily physically separated from the sender) receiving the RRR has transmitted enough frames at a lower rate, thus providing some bandwidth for dim and burst signaling.

Existing AMR and EVRC applications in synchronous networks like the Global System for Mobile communications (GSM) or the IS-95 system use either inband or out-of-band concepts for rate control. New generation communications networks support packet-based transmission. In the case of packet-based transmission, control information like CMRs or RRRs is preferably sent inband with traffic data for mainly two reasons. First, several packet-based communications network concepts support priority-setting depending on the type of the transmitted data. Traffic data in general have real-time priority. Therefore, the fastest way to transport urgent control information is always inband on the channel. Second, co-locating traffic data and control information on the same traffic channel simplifies interoperability in the case that a communication involves several types of networks. In this case, a conversion between traffic data formats and/or protocol formats at one network type's boundary would not or not significantly effect the contents of the traffic channel. Furthermore, the original time relation of traffic data and control information is kept.

Although packet-based communications networks have several advantages, such networks also suffer from serious drawbacks. For example, packet-based communications networks like networks operating in accordance with the Internet Protocol (IP) do not always offer a defined quality-of-service that is high enough for all types of applications. IP networks such as the public Internet often involve problems like packet loss, network jitter in the form of time-varying delays and out-of-sequence packets and congestions leading to delays. To cope with these problems, techniques such as the Real-Time Protocol (RTP) and jitter buffers have been developed.

RTP is specified in the Internet Engineering Task Force (IETF) documents RFC 1889; RTP: A Transport Protocol for Real-Time Applications, Request for Comments: 1889, January 1996 and RFC 1890; RTP profile for Audio and Video Conferences with Minimal Control, Request for Comments: 1890, January 1996, published in the Internet (http://www.i-etf.org). RTP is a real-time transport protocol which provides end-to-end network transport functions suitable for applications transmitting real-time data in the form of RTP packets. Usually, applications run RTP on top of the User Datagram Protocol (UDP) to make use of the UDP's multiplexing and checksum services. Both protocols contribute parts of the transport protocol functionality. However, RTP may also be used with other underlying network or transport protocols.

RTP provides several services like sequence numbering, which tells a receiving side if the packets are arriving in sequence or at all, time stamping and delivery monitoring. However, RTP itself does not provide any mechanism to ensure timely delivery, to prevent out-of-order delivery or to provide other quality-of-service guarantees. Therefore, RTP is often combined with jitter buffers as described in WO 00/42749.

Jitter buffers are memories which are used for sorting received packets into the correct sequence and for delaying the buffered packets as needed to compensate for variations in network delay. The above RTP specification RFC 1889; RTP: A Transport Protocol for Real-Time Applications, Request for Comments: 1889, January 1996 discusses such inter arrival jitter in section 6.3.1 and in appendix A.8.

Each received packet is usually buffered such that it is aligned with the packets already stored in the jitter buffer. This means that packets arriving out-of-sequence are aligned relatively to the current buffer contents and inserted in the appropriate buffer position. In the course of this, however, the buffer algorithm may determine that a received packet is already too old to be aligned with earlier received packets already stored in the buffer. In this case the received packet is discarded. If the current network-jitter situation allows, the buffer size is adaptively reduced to decrease the buffer delay by discarding one or possibly more stored packets.

Although the use of a jitter buffer has several advantages, buffering of packets has the drawback that the processing of the packets is delayed. Therefore, any control information contained inband in the packets will also be buffered and will be available for control purposes only with a certain delay, i.e., the control information will take effect delayed. Moreover, in the case of packet loss the control information comprised within a lost packet will not take effect at all. In such a case it has been-proposed for networks employing EVRC to continue to operate as indicated by the control information comprised within the last packet received (RTP-EVRC; An RTP Payload Format for EVRC Speech, Internet Draft of the Internet Engineering Task Force; May 8, 2000; Expires: Nov. 8, 2001, section 4.1)

However, this suggestion can not solve the discussed problems satisfactory. The reason therefore is the fact that packets may arrive out-of-sequence so that earlier sent packets arrive later than packets sent later. This means that the last received packet is not necessarily the newest packet, i.e. the packet most recently generated or sent, amongst the packets that yet have been received. It may even be too old to be aligned with the packets stored in the buffer and may thus be discarded by the buffer algorithm.

There is a need for a method of handling in a packet-based communications-network control information sent inband with traffic data, the method allowing to cope in a reliable manner with control information delay and out-of-date control information. There is also a need for a network component of a packet-based communications network operating in accordance with such a method and communications systems comprising this network component.

SUMMARY OF THE INVENTION

The existing need is satisfied according to the invention by a method of handling in a packet-based communications network control information sent inband with traffic data, wherein the network has a buffer for temporarily storing received packets, the method comprising receiving one or more packets and determining first control information comprised therein, deciding if the first control information is newer than second control information received earlier, and, if the first control information is newer that the second control information, handling the first control information independently from a buffering of the one or more received packets which contain the first control information.

According to the invention a decision takes place to determine if the newly received first control information is actually newer, i.e., has been generated or sent more recent, than second control information which has been available prior to receipt of the packets comprising the first control information.

This decision can be performed independently from a buffering of the one or more packets comprising the first control information or from a buffering of any other received packets. This means for example that the decision can take place prior to, concurrently with, or after buffering of the received packets comprising the first control information. The decision may even be performed if no buffering is performed at all. This may be the case for example if the current network jitter situation allows to adaptively reduce the buffer size temporarily to zero or if a packet is discarded.

The decision allows to identify at an early stage whether urgent control information is available-which has been generated or sent recently. In such a case, this newest control information may be handled in accordance with a predefined handling scheme. Prior to receipt of the first control information, the newest control information available to the network component is constituted by the second control information. After receipt of the first control information, the newest control information may be either the first control information or the second control information depending on the result of the decision.

In any case the newest control information is handled independently from a buffering of the one or more received packets which comprise this control information. For example, the newest control information may be used even if the one or more received packets which comprise the newest control information are still being buffered. Consequently, the buffering of received packets does no longer result in delaying the newest control information. Moreover, even in the case of packet loss it can be ensured that always the newest control information which has actually been received is used.

Since the newest control information may be handled independently from a buffering of the one or more received packets which comprise this control information, the control information is preferably not directly related to the processing of the traffic data comprised within these packets. In this case control information and traffic data can be considered separately and the newest control information may take effect independently from a processing of the traffic data included within the packets which comprise the newest control information.

The handling of the first control information which is newer than earlier received second control information can be performed in various ways. For example, the handling may include controlling the network in accordance with the first control information or simply forwarding the first control information. The controlling can be performed either in the network component which includes the buffer or in a network component remote therefrom. In the latter case the handling of the first control information may include forwarding the first control information independently from the one or more received packets which comprise the first control information. Preferably, the first control information is forwarded from the network component including the buffer to a further network component remote therefrom.

The first control information and the second control information which has been received earlier preferably have the same structure and serve for identical control purposes. Upon receipt of the packets comprising the first control information, the second control-information can currently be in use for controlling the network and may subsequently be replaced, as far as controlling the network is concerned, by the first control information if the latter has been generated or sent more recently than the second control information.

The decision if the first information is newer than the second control information can be based on a comparison of relative or absolute ordering information. Ordering information may be associated with the first and second control information. This would be the case, for example, if the ordering information is attached to the control information itself or to the packet comprising the control information. A packet may comprise more than one control information portion. In this case ordering information is preferably associated with each single control information portion comprised within the packet. If the relationship in time among the various control information portions of a single packet is known, it may be sufficient to associate uniform ordering information, for example in the form of a uniform ordering parameter, to such a packet.

The ordering information may be indicative of the relative or absolute order in which the packets have been generated-or sent or are to be buffered. For example, the ordering information may be an individual number like a sequence number or a packet number, or a time stamp of a packet. An individual number may be assigned to each received packet upon receipt thereof. The individual number preferably indicates a relative priority or processing rank of the one or more received packets relative to all buffered packets. In other words, the individual number may be used for aligning the individual packets stored in the buffer. The individual number can be derived for example by comparing header information of the packets. It should be noted that the individual number can be a fictitious information that has to be calculated from the various ordering information contained in a specific packet.

According to a further aspect of the invention, the first control information is stored at least temporarily if it has been found that the first control information is newer than the second control information which has been received earlier. In such a case, ordering information associated with the first control information can be stored also.

The control information carried inband with traffic data can serve for various control purposes. Possible control purposes may only be restricted in that the control information is preferably not directly related to a processing of packets or contents of packets which comprise control information. Otherwise, a handling of the control information independent from the buffered packets will in most cases no longer be useful. The control information is preferably of such a nature that it need not be kept, so that relatively older control information can be discarded without any negative effects. This might be the case when the control information is an outcome of a pending control command which is continuously being sent over a certain period of time, i.e. which is identically comprised within a plurality of consecutive packets.

According to a first scenario it might be allowed that a sender of control information like CMRs abandons the pending control information without having notice of the control information's success at a receiving side. An abandonment may become necessary in the case the present conditions urge to change the control information. According to a second scenario the sender keeps sending the control information until the receiving side has acted upon the control information to a required degree, so that the sender can determine that the receiving side has actually acted upon the control information. Thus, a closed control loop may be established. In such a case the sender does not abandon pending control information without having determined that the receiving side has actually utilized the control information in the required way. For example, the sender may keep sending RRRs until it detects that the receiving side has been sending at a reduced data rate sufficiently long enough.

According to a preferred realization, the control information comprised within the received packets is indicative of a mode transition in a sending direction of the receiving network component or of a further network component to which the control information has been forwarded. Such a mode transition can relate to a bit rate, for example a transmission or encoding bit rate. Preferably, the control information relates to a request for a setting of a codec mode.

It should be noted that the basic data unit underlying the application to be controlled by the control information does not necessarily have to be a packet. In many cases, for example in the case of speech coding, the basic data unit will be a frame. Individual packets can carry one or multiple frames and the number of frames can even vary during a call. Each frame comprised within a packet may carry individual control information. In this case, when speaking of control information comprised within a packet, always the control information which has been generated or sent most recently is meant. In other words, if a single packet comprises control information generated at various points in time, the decision whether this packet comprises control information which is actually-newer than further control information received earlier is based on the relatively newest control information comprised within the packet.

The above method can be implemented both as a hardware solution and as a computer program product comprising program code portions for performing the individual steps of the method when the computer program product is run on a computer of the communications network. The computer program product may be stored on a computer readable recording medium like a data carrier attached to or removable from the computer.

The hardware solution is constituted by a network component of a packet-based communications network controlled in accordance with control information sent inband together with traffic data, wherein the network component comprises a buffer for buffering one or more received packets and a processor. The processor determines first control information comprised within the one or more received packets and decides if the first control information is newer than the second control information which has been received earlier and which might currently be in use for controlling the network. If the first control information is newer than the second control information, the processor may handle the first control information independently from the one or more packets comprising the first control information. For example, the processor may initiate a forwarding of the first control information to a controller co-located with the processor or to a remote network component. The processor may also itself control the communications network in accordance with the first control information.

The network component may further comprise a memory for storing at least one of a copy of newest-control information and ordering information associated with the newest control information. As has been mentioned before, the newest control information is the control information available to the network component which has been most recently generated or sent.

If the handling of the first control information within the network component exceeds a mere forwarding, the network component may further comprise a unit which is controlled in accordance with the newest control information available to the network component. Such a unit may be constituted by an encoder which preferably encodes real-time communications data like speech or video. Upon receipt of first control information which is newer than second control information available before, an encoder mode transition in a sending direction can thus be initiated. This mode transition may relate to an encoding bit rate and may take place immediately or with a certain delay specific to the respective application.

The network component discussed above may have different tasks in the communications network. For example, the network component may be a converting gateway arranged between a packet based communications network and a circuit switched communications network. Also, the network component may function as a packet terminal arranged at the edge of a packet-based network when interconnecting a wireless communications network and a wired communications network. Consequently, the network component may be part of a wireless-to-packet-wireline communications system or a packet-to-circuit switched communications system.

BRIEF DESCRIPTION OF THE DRAWINGS

Further advantages of the invention will become apparent upon reference to the following description of preferred embodiments of the invention in the light of the accompanying drawings, in which.

DESCRIPTION OF PREFERRED EMBODIMENTS

The present invention can be practiced in any communications network which comprises packet-based communications between at least two network nodes, provides for a buffering of received packets and allows to sent control information on a traffic channel that is also used for traffic data. In the following description of preferred embodiments, the invention is exemplarily set forth with respect to a jittery communications network comprising IP functionality and employing AMR on top of RTP and UDP.

As an example, control of such a network based on control information in the form of codec mode requests (CMRs), as illustrated for example in AMR, GSM 06.71 version 7.0.2 Release 1998, Digital cellular telecommunications system (Phase 2+); Adaptive Multi-Rate (AMR); Speech processing functions; General description, herewith incorporated by reference as far as inband controlling by means of CMRs is concerned, is described. It will be appreciated by those of ordinary skills in the art that the invention can also be practiced in any other packet-based communications network using other transport protocols and inband control information serving for control purposes different from a bit rate control.

Figure 1:
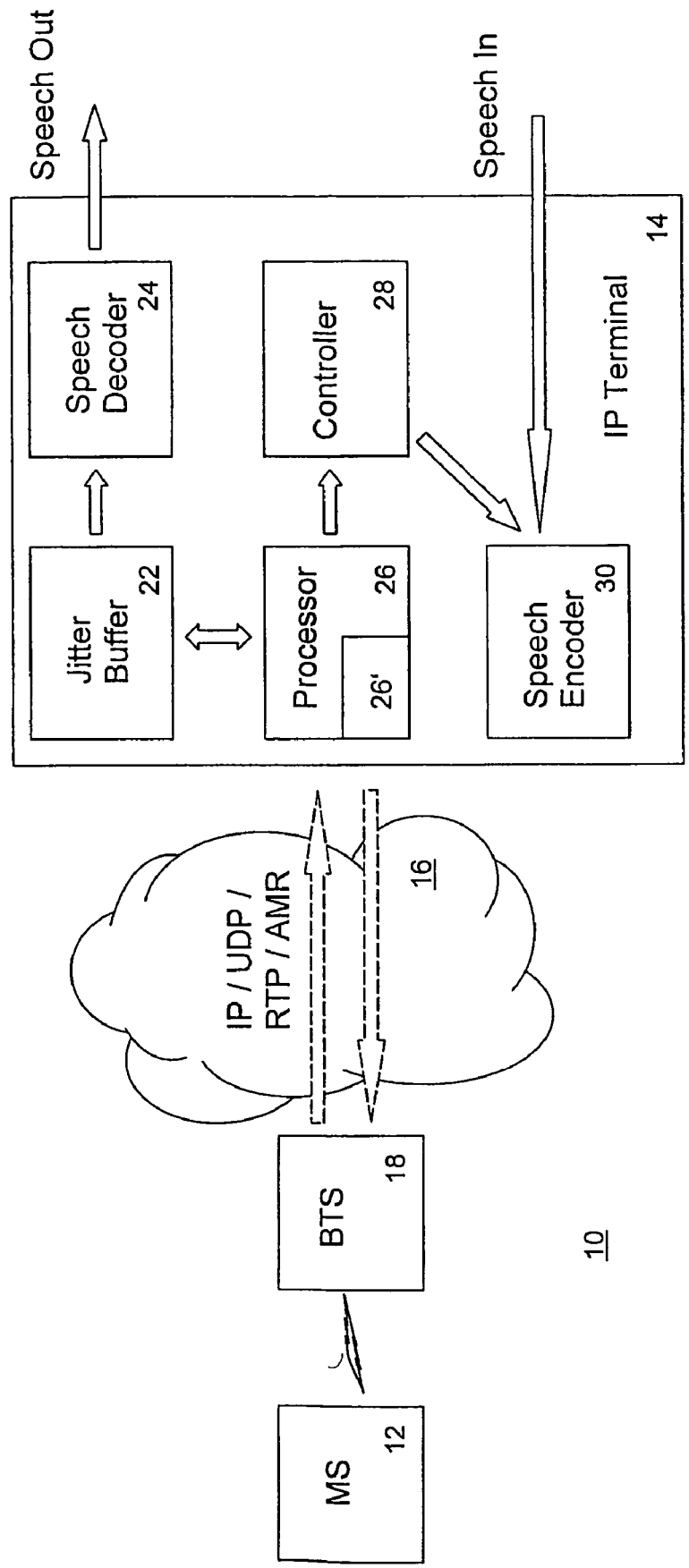
FIG. 1 shows a schematic diagram of a first embodiment of the invention in the form of a wireless-to-packed-wireline communications system.

In FIG. 1, a first embodiment of a communications system 10 according to the invention is shown. The embodiment depicted in FIG. 1 illustrates communications between a Mobile Station (MS) 12, for example a wireless telephone, and a wireline, i.e. fixed line IP terminal 14 via an IP network 16. The IP network 16 may be a corporate Local Area Network (LAN).

The communications system 10 further comprises a Base Transceiver Station (BTS) 18 which communicates via a wireless connection 20 with the MS 12 and via the IP network 16 with the IP terminal 14. Here, it is assumed for simplicity reasons that the fixed IP terminal 14 is connected to the BTS 18 via a single IP network 16 without further network types arranged between the BTS 18 and the IP terminal 14.

To cope with IP network jitter and to align RTP packets received from the BTS 18, the IP terminal 14 comprises an adaptive jitter buffer 22 as described in WO00/42749, herewith incorporated by reference as far as the construction and the functionality of the jitter buffer 22 is concerned. The IP terminal 14 further comprises a speech decoder 24, a processor 26 with a processor memory 26', a controller 28 and a speech encoder 30. The IP terminal 14 thus implements voice over IP (VoIP) functionality.

The RTP packets received via the IP network 16 are stored in the jitter buffer 22 in an aligned manner. The alignment of the RTP packets in the jitter buffer 22 is controlled by the processor 26 and reinstalls the order in which the RTP packets have been generated. The RTP packets aligned in the jitter buffer 22 are delayed as needed to compensate for delay variations within the IP network 16 and released periodically to the application of speech decoding performed within the speech decoder 24. The speech decoder 24 outputs the decoded speech.

The processor 26 further determines control information, i.e., CMRs comprised within the RTP packets received via the IP network 16. The processor 26 then forwards the determined CMRs, as will be described in more detail below with reference to FIG. 3, to the controller 28. The controller 28 then controls the speech encoder 30 in accordance with the CMRs received from the processor 26.

To implement the codec rate requested for a decoder on the opposite side of the IP network 16, the speech encoder 30 follows the CMRs received from the controller 28 and encodes speech frames with a specific number of bits per frame dependent on the codec mode, which has been set by the controller 28. One or more frames are then taken to build an RTP packet, which is subsequently sent via the IP network 16 to the BTS 18.

In the following, rate control using CMRs will be described in more detail for the communications system 10 shown in FIG. 1. The MS 12 continuously or intermittently measures the quality of the DL data received from the BTS 18 and judges the current radio quality in DL. Based on this judgment, the MS 12 generates an appropriate DL CMR which is sent to the BTS 18. In the embodiment depicted in FIG. 1, the BTS 18 acts as master and decides both on the actual codec mode to use in UL and DL direction respectively. This means that the BTS 18 generates an own DL CMR, simultaneously considering the CMR received from the MS 12 and its own current settings for mode changes. These might restrict the ability to follow immediately or to follow at all a CMR received from the MS 12.

The CMR generated by the BTS 18 is sent as control information on a traffic channel, i.e., inband, via the IP network 16 to the IP terminal 14. There it is aimed to rapidly take effect by steering the speech encoder 30 to the desired bit rate to adapt as soon as possible to the current DL radio conditions. This will be described in more detail below with reference to FIG. 3. In the case the IP terminal 14 receives no newer CMR, the current encoding mode is kept. Since radio link conditions typically change gradually, two subsequent mode transitions will occur within a period of time which is long compared to the transmission delay.

Figure 2:
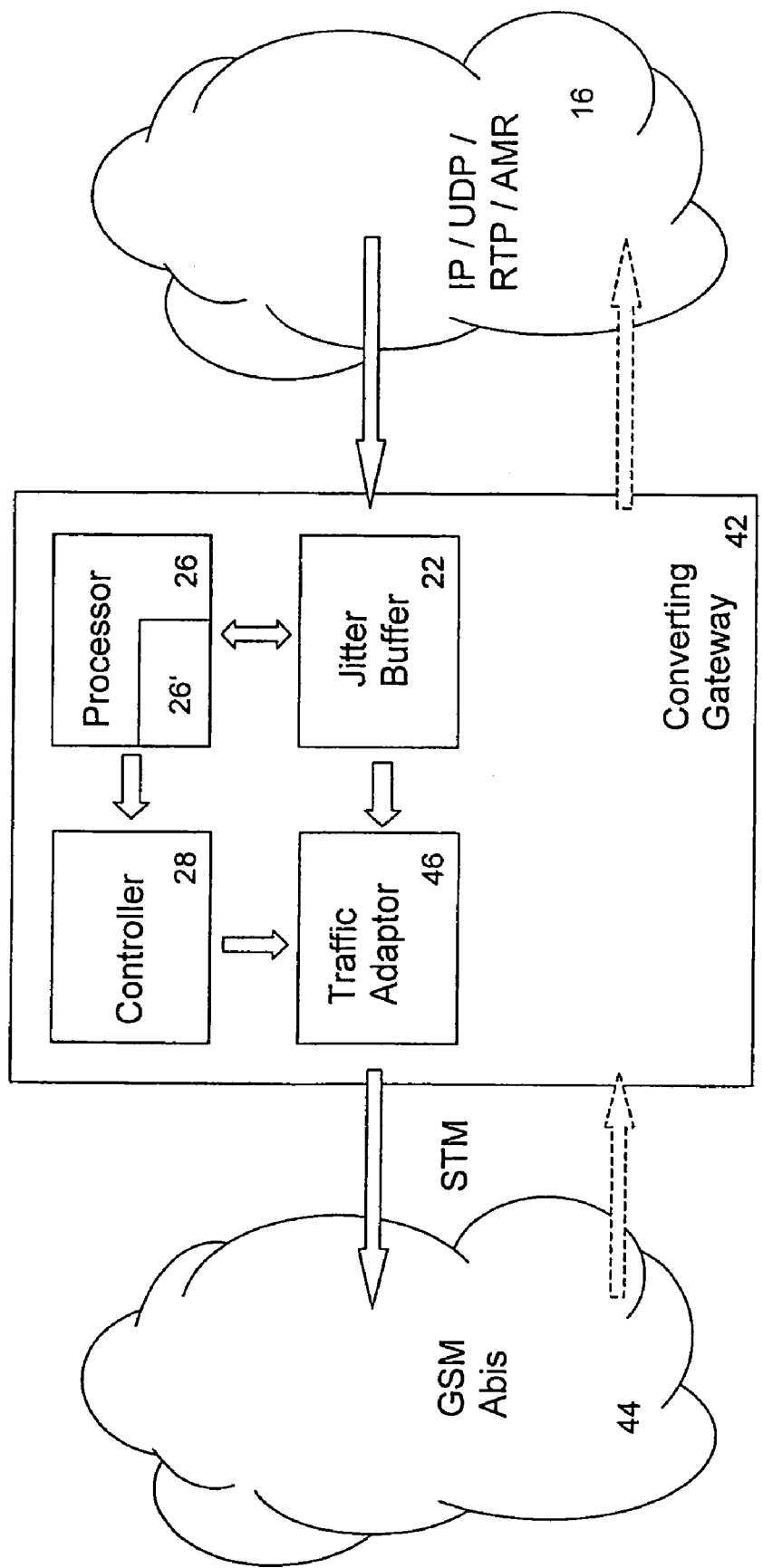
FIG. 2 shows a schematic diagram of a second embodiment of the invention in the form of a packet-to-circuit-switched communications system.

In FIG. 2 a second embodiment of a communications system 40 according to the invention is shown. The communications system 40 comprises a packet-to-circuit-switched converting gateway 42 (which could also be a network node) for voice communications. The converting gateway 42 comprises a jitter buffer 22 for buffering one or more received packets and a processor 26 which aligns the received packets in the jitter buffer 22 in accordance with ordering information comprised within the received packets. The communications system 40 further comprises a controller 28 and a traffic adaptor 46 which is controlled by the controller 28.

The processor 26 processes and handles the control information comprised within the received packets as will be discussed below with reference to FIG. 3. It should be noted that the processor 26 comprises a memory 26' for storing newest control information together with ordering information associated with the newest control information. The converting gateway 42 terminates on one side a jittery packet-based IP network 16 and on an opposite side a circuit-switched network 44 in the form of a frame-based GSM network using Synchronous Time-Multiplexed (STM) transmission (GSM Abis).

As has been mentioned above, the converting gateway 42 stores RTP packets received on a traffic channel via the IP network 16 in the jitter buffer 22, where the packets are aligned by the processor 26. The packets received via the IP network 16 do not only comprise frames of traffic data, but also inband control information in the form of CMRs. The traffic adaptor 46 extracts and, if applicable, rearranges a frame of traffic data from the jitter buffer 22, inserts control information specific to the circuit-switched protocol (at least a sync header) and writes the latest CMR from memory 26' in the CMR field. The traffic adaptor 46 then continuously forwards the extracted frames on a frame-by-frame basis to the circuit-switched side 44.

In the following, the handling of control information in the form of CMRs in the IP terminal 14 depicted in FIG. 11 and the converting gateway 42 depicted in FIG. 2 will be exemplarily described with reference to the flowchart of FIG. 3. The basic handling mechanism is the same for the IP terminal 14 and the converting gateway 42. Therefore, the following discussion generally applies to both cases. The cases in which the CMR handling of the IP terminal 14 differs from that of the converting gateway 42 will be discussed separately.

Figure 3:
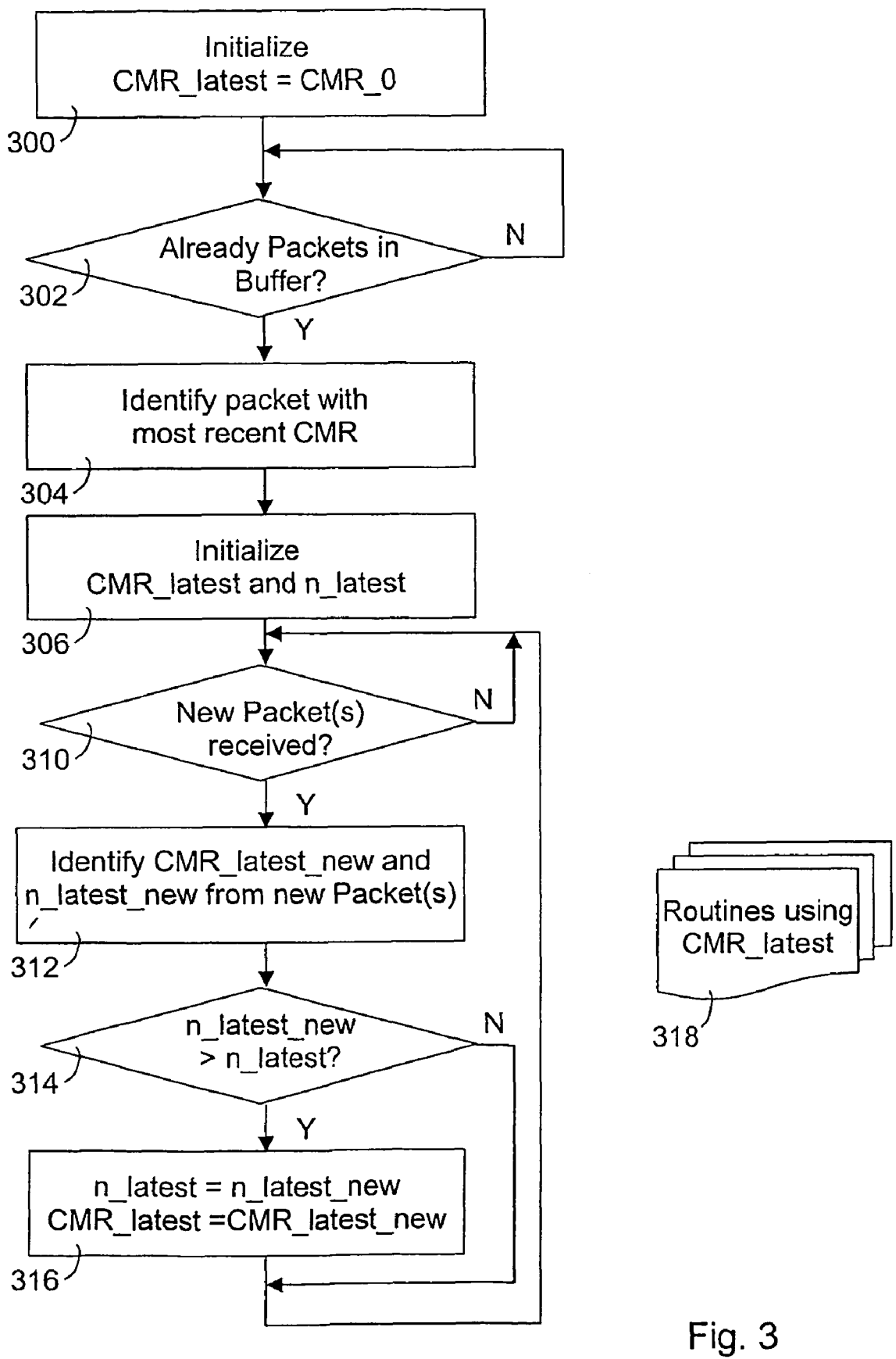
FIG. 3 shows a flow chart of a method according to the invention of handling control information in the communications systems depicted in FIGS. 1 and 2.

The method illustrated in FIG. 3 starts with an initialization stage. During the initialization stage, two static parameters, CMR_latest and n_latest, the values of which are to be stored in the memory 26' of the processor 26, are initialized.

The first static parameter CMR_latest indicates the newest codec mode request available to the IP terminal 14 or the converting gateway 42. CMR_latest corresponds to that available CMR which has been generated most recently. The second static parameter n_latest designates relative or "specific" ordering information associated with CMR_latest. This "specific" ordering information is determined from an "absolute" ordering information n extracted from the packets; it may differ from the latter by an arbitrary integer constant c as will be explained in more detail below.

The "absolute" ordering information can be derived from the header information of the packets. This "absolute" ordering information is assigned to each packet upon receipt; it is used by the processor 26 to align the received packets relatively to each other and to put them in the correct order into the jitter buffer 22. In the case of RTP, the header information exploited for packet ordering is the packet's sequence number and/or time stamp which can both be derived from packet heather.

In this context it should be mentioned once more that in the case of speech coding the basic data unit will be a frame and that each packet may comprise one or more frames. In such a case the most recent CMR of a packet might be determined by searching the packet for the most recent frame to which a CMR is attached.

In an initial step 300 of the method depicted in FIG. 3, CMR_latest is initialized with an appropriate value CMR_0. CMR_0 will be used by a plurality of routines 318 running independently from the method depicted in FIG. 3 as long as no packet containing a CMR has yet been received.

In a second step 302 of the initialization stage, the processor 26 determines whether or not there are already packets in the jitter buffer 22. In the case the jitter buffer 22 comprises already one or more packets, the processor 26 identifies in step 304 the packet with the most recent CMR. The processor 26 then initializes in step 306 CMR_latest with the most recent CMR comprised within this packet and n_latest with the "specific" ordering information of this packet.

The variable n_latest, reflecting the "specific" ordering information, is of type integer and is handled employing wrap-around based arithmetics; its initial value can be any integer number. Due to the fact that the "specific" ordering information given by n_latest needs only to reflect the sending positions of the received packets relative to each other, there may be an arbitrary, constant offset c between the "absolute" ordering information n and the "specific" ordering information n latest. In other words:

$$n\_latest = n + c \tag{1}$$

The constant c have any value, it can for instance serve to set the initial value of n_latest to 0 or 1.

Summarizing, n is the ordering information directly extracted from the packets and is used to put the packets into the jitter-buffer 22. On the other hand, n_latest is a derived auxiliary parameter that enables to identify the packet containing CMR_latest.

After the initialization of CMR_latest and n_latest has been performed, the method continues with step 310. In step 310 the processor 26 determines if new packets are received.

According to a first scenario, step 310 is performed as a regularly called routine that takes care of updating CMR_latest. In this case it is checked in step 310 if one or more new packets have been received since the last call of this routine. In the first scenario the processor 26 regularly polls the jitter buffer 22 as indicated by step 310.

According to a second scenario, step 310 of FIG. 3 may be modified such that the processor 26 works interrupt driven. This means that one or more newly received packets are immediately signaled to the processor 26. In reaction to such a signaling, the method continues with step 312.

According to a third scenario, the processor 26 polls the jitter buffer not in a regular manner but occasionally and preferably with a higher polling frequency than the regular polling described in the first scenario. It will be understood by those of ordinary skills in the art that the third scenario is a generalization of the first scenario.

In step 312, the processor 26 identifies the value of the newest CMR comprised within the one or more newly received packets, i.e., CMR_latest_new. n_latest_new is assigned the value of the "specific" ordering information of the packet associated with CMR latest new.

In a next step 314, the processor 26 decides-if the newest CMR latest_new comprised within the newly received packets is actually newer than CMR_latest currently stored in the processor's 26 memory 26'. This decision is based on a comparison of the ordering information n_latest new associated with CMR_latest_new with the ordering information n_latest stored in the memory 26' and associated with CMR_latest. If n_latest_new<n_latest, the method loops back to step 310.

On the other hand, if n_latest_new>n_latest, i.e., when the control information comprised within the newly received packets is actually newer than the control information currently stored in the memory 26', the method continues with step 316. In step 316 n_latest is set to the value of n_latest_new and CMR_latest is set to the value of CMR-latest new.

The values of the two parameters stored in the memory 26' thus become updated. From step 316, the method loops back to step 310.

While steps 300 to 316 are performed, the plurality of routines 318 are performed by at least one of the processor 26, the controller 28 and the traffic adaptor 46. Routines 318 handle CMR_latest independently from the fact whether or not the newly received packets are to be stored in the jitter buffer 22. In other words, even if the packet marked with n_latest is not yet processed or forwarded, the inband control information comprised therein is handled further.

The handling of CMR_latest in step 318 generally depends on the construction of the communications system implementing the method depicted in FIG. 3 as well as on the actual purpose and content of the control information. In the communications system according to the first embodiment depicted in FIG. 1, the handling of CMR_latest is performed by the controller 28, which controls the speech encoder 30 each time the speech encoder 30 is subsequently called to encode a new speech segment such that the speech encoder 30 uses the encoding mode specified by CMR_latest. The fact that CMR-latest actually constitutes the newest control information available on the side of the IP terminal 14 ensures that the speech encoder 30 follows the CMR sent from the BTS 18 as closely as possible to account for the current DL radio conditions.

It should be noted that the actual codec mode used by the encoder 30 may deviate from the codec mode indicated by CMR_latest if requested by control routines of higher priority. These might restrict or reduce the possibility of the encoder 30 to follow immediately a codec mode request received from the BTS 18.

In the communications system according to the second embodiment depicted in FIG. 2, the handling of CMR_latest is somewhat different. The traffic adaptor 46 performs a handling of CMR_latest by attaching CMR latest to every frame that is scheduled to have a CMR attached for setting any inband CMR towards the circuit-switched side 44. This ensures that always the latest CMR available to the converting gateway 42 is forwarded to the circuit-switched side 44. Hence, CMRs are passed with the smallest possible delay from the converting gateway 42 to the circuit-switched side 44 regardless of the fact whether or not the newly received packets which comprise CMR_latest are still buffered for later use.

The communications systems depicted in FIG. 1 and FIG. 2 and utilizing AMR are constructed such that the network component emitting a specific CMR will keep sending a certain value until e.g. another value, i.e. another mode, becomes necessary. It is therefore not necessary to process such a type of control information in the original order and discarding of older control information will generally not lead to any negative result. Fulfillment of a CMR could be seen from the codec mode used in the opposite direction.

Although the invention was described with reference to FIG. 1 and FIG. 2 for communications systems utilizing AMR, the invention may also be practiced in communications systems utilizing EVRC. In such a case a network component sending an RRR will not receive an explicit acknowledgement that the RRR has actually been fulfilled. Instead, the receiving side has to send at a reduced rate long enough to ensure that the network component sending the RRR has enough bandwidth for dedicated purposes. Thus, the response to an RRR is not exactly specified but depending on the situation.

It will be appreciated by those of ordinary skills in the art that this invention can be embodied in other specific forms without departing from its essential character. The embodiments described above should therefore be considered in all respects to be illustrative and not restrictive. The scope of the invention is determined solely by the following claims, and all modifications that fall within that scope are intended to be included therein.

The invention claimed is:

1. A method of handling control information sent inband in a packet-based communications network with traffic data, wherein the network has a buffer for temporarily storing received packets, the method comprising:
   receiving one or more packets and determining first control information comprised therein, wherein, upon receipt of the one or more packets, each received packet is assigned an individual number indicating a processing rank of the received packet with respect to all buffered packets;
   utilizing the assigned individual number for deciding if the first control information is newer than second control information received earlier, the second control information being stored in a memory, wherein the first control information and the second control information correspond to received codec mode requests;
   if the first control information is newer than the second control information, handling the first control information independently from a buffering of the one or more received packets which contain the first control information.

2. The method of claim 1, wherein, if the first control information is newer than the second control information, the first control information is handled even if the one or more received packets which comprise the first control information are still being buffered.

3. The method of claim 1, wherein handling of the first control information includes controlling the network -in accordance with the first control information.

4. The method of claim 1, wherein handling of the first control information includes forwarding the first control information independently from the one or more received packets which comprise the first control information.

5. The method of claim 1, wherein the first control information serves for the same control purpose as the second control information which is used for controlling the network at the time of receipt of the one or more packets which comprise the first control information.

6. The method of claim 1, wherein the decision if the first control information is newer than the second control information is based on a comparison of individual ordering information associated with each of the first and the second control information.

7. The method of claim 1, wherein the individual ordering information is indicative of the order in which the packets have been generated or sent.

8. The method of claim 1, wherein, if the first control information is newer than the second control information, the first control information and the ordering information associated with the first control information are temporarily stored.

9. The method of claim 1, wherein the control information is indicative of a mode transition in a sending direction.

10. The method of claim 1, wherein the control information relates to a control of a bit rate.

11. The method of claim 1, wherein the traffic data comprised within the packets contain one or more frames of real-time communications data.

12. A network component of a packet-based communications network controlled in accordance with control information sent inband with traffic data, the network component comprising:
- a buffer for buffering one or more received packets, wherein upon receipt of the one or more packets, each received packet is assigned an individual number indicating a processing rank of the received packet with respect to all buffered packets; and
- a processor which determines, utilizing the assigned individual number, first control information comprised within the one or more received packets and which decides if the first control information is newer than second control information received earlier, the second control information being stored in a memory, wherein the first control information and the second control information correspond to received codec mode requests, the processor handles the first control information independently from a buffering of the one or more received packets which comprise the first control information.

13. The network component of claim 12, further comprising a memory for temporarily storing at least one of the newest control information and ordering information associated with the newest control information.

14. The method of claim 12, further comprising an encoder which is controlled in accordance with the newest control information.

15. The network component of claim 12, wherein the network component is a converting gateway arranged between a packet-based network and a circuit-switched network or a packet terminal arranged between a wireless communications network and a packet-wireline communications network.

16. A wireless-to-packet-wireline communications system, comprising
- a network component of a packet-based communications network-controlled in accordance with control information sent inband with traffic data, wherein said network component further comprises:
  - a buffer for buffering one or more received packets, wherein, upon receipt of the one or more packets, each received packet is assigned an individual number indicating a processing rank of the received packet with respect to all buffered packets; and
  - a processor which determines, utilizing the assigned individual number, first control information comprised within the one or more received packets and which decides if the first control information is newer than second control information received earlier, the second control information being stored in a memory, wherein the first control information and the second control information correspond to received codec mode requests, the processor handles the first control information independently from a buffering of the one or more received packets which comprise the first control information.

17. The wireless-to-packet-wireline communications system of claim 16, wherein the network component further comprises a memory for temporarily storing at least one of the newest control information and ordering information associated with the newest control information.

18. The wireless-to-packet-wireline communications system of claim 16, wherein the network component further comprises an encoder which is controlled in accordance with the newest control information.

19. A packet-to-circuit-switched communications system, comprising:
- a network component of a packet-based communications network-controlled in accordance with control information sent inband with traffic data, wherein said network component further comprises:
  - a buffer for buffering one or more received packets, wherein upon receipt of the one or more packets, each received packet is assigned an individual number indicating a processing rank of the received packet with respect to all buffered packets; and
  - a processor which determines, utilizing the assigned individual number, first control information comprised within the one or more received packets and which decides if the first control information is newer than second control information received earlier, the second control information being stored in a memory, wherein the first control information and the second control information correspond to received codec mode requests;
  - wherein, if the first control information is newer than the second control information, the processor handles the first control information independently from a buffering of the one or more received packets which comprise the first control information.

20. The packet-to-circuit-switched communications system of claim 19, wherein the network component further comprises a memory for temporarily storing at least one of the newest control information and ordering information associated with the newest control information.

* * * * *

UNITED STATES PATENT AND TRADEMARK OFFICE
CERTIFICATE OF CORRECTION

PATENT NO. : 7,991,000 B2  
APPLICATION NO. : 10/495536  
DATED : August 2, 2011  
INVENTOR(S) : Wittmann Page 1 of 2

It is certified that error appears in the above-identified patent and that said Letters Patent is hereby corrected as shown below:

On the Cover Page, item (57), under "ABSTRACT", in Column 2, Lines 1-2, delete "NetworkA" and insert -- Network. A --, therefor.

On the Cover Page, item (57), under "ABSTRACT", in Column 2, Lines 2-3, delete "(CMR latest, CMR latest new)" and insert -- (CMR_latest, CMR_latest_new) --, therefor.

On the Cover Page, item (57), under "ABSTRACT", in Column 2, Line 7, delete "(CMR latest new)" and insert -- (CMR_latest_new) --, therefor.

On the Cover Page, item (57), under "ABSTRACT", in Column 2, Line 9, delete "(CMR latest new)" and insert -- (CMR_latest_new) --, therefor.

On the Cover Page, item (57), under "ABSTRACT", in Column 2, Line 10, delete "(CMR latest)" and insert -- (CMR_latest) --, therefor.

On the Cover Page, item (57), under "ABSTRACT", in Column 2, Line 11, delete "(CMR=most recent CMR latest new)" and insert -- (CMR_latest_new) --, therefor.

On the Cover Page, item (57), under "ABSTRACT", in Column 2, Line 12, delete "(CMR latest)," and insert -- (CMR_latest), --, therefor.

On the Cover Page, item (57), under "ABSTRACT", in Column 2, Line 13, delete "(CMR latest new)" and insert -- (CMR_latest_new) --, therefor.

On the Cover Page, item (57), under "ABSTRACT", in Column 2, Lines 15-16, delete "(CMR latest new)." and insert -- (CMR_latest_new). --, therefor.

In Column 3, Line 27, delete "4.1)" and insert -- 4.1). --, therefor.

Signed and Sealed this  
Twentieth Day of March, 2012

David J. Kappos  
*Director of the United States Patent and Trademark Office*

CERTIFICATE OF CORRECTION (continued)
U.S. Pat. No. 7,991,000 B2

In Column 7, Line 27, delete "DESCRIPTION" and insert -- DETAILED DESCRIPTION --, therefor.

In Column 10, Line 19, delete "n latest." and insert -- n_latest. --, therefor.

In Column 10, Line 26, delete "jitter-buffer" and insert -- jitter buffer --, therefor.

In Column 10, Line 53, delete "CMR latest new." and insert -- CMR_latest_new. --, therefor.

In Column 10, Line 55, delete "CMR latest_new" and insert -- CMR_latest_new --, therefor.

In Column 10, Line 58, delete "n_latest new" and insert -- n_latest_new --, therefor.

In Column 10, Line 67, delete "CMR-latest new." and insert -- CMR_latest_new. --, therefor.

In Column 11, Line 22, delete "CMR-latest" and insert -- CMR_latest --, therefor.

In Column 11, Line 36, delete "CMR latest" and insert -- CMR_latest --, therefor.

In Column 12, Line 37, in Claim 2, delete "network –in" and insert -- network in --, therefor.

In Column 13, Line 26, in Claim 14, delete "method" and insert -- network component --, therefor.

In Column 13, Line 35, in Claim 16, delete "comprising" and insert -- comprising: --, therefor.

In Column 13, Line 37, in Claim 16, delete "network-controlled" and insert -- network controlled --, therefor.